March 8, 1949.  C. J. BRASEFIELD  2,463,510
CONDITION RESPONSIVE INDICATING DEVICE
Filed Dec. 19, 1944
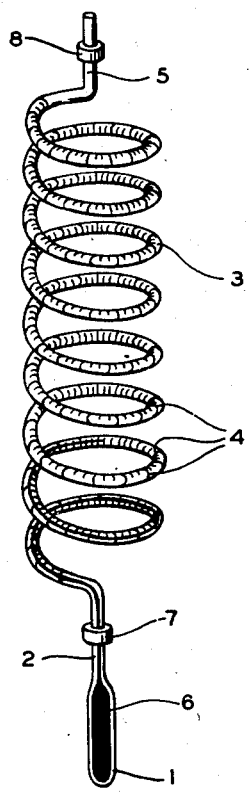
INVENTOR.
CHARLES J. BRASEFIELD
BY
*William D. Hall*
ATTORNEY

UNITED STATES PATENT OFFICE 2,463,510

CONDITION RESPONSIVE INDICATING DEVICE

Charles J. Brasefield, Little Silver, N. J.

Application December 19, 1944, Serial No. 568,922

2 Claims. (Cl. 73—371)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to indicating devices of a compact nature and particularly to thermometers and the like.

The need for indicating devices of the compact nature has long been recognized. This is particularly true in indicating devices measuring temperature over a wide range. In many cases thermometers presently being used are of several feet in length. It frequently happens that not only is it difficult to provide space for an instrument of this length, but it is difficult to accurately read such instruments from a given eye position.

It is, therefore, an object of this invention to provide a means for indicating temperatures that shall indicate a wide range of temperature, but not requiring a great length of instrument.

It is a further object of this invention to provide a means of indicating temperature that may be easily read from a given eye position.

It is a further object of this invention to provide an indicating device that shall be simple and inexpensive to manufacture.

It is a further object of this invention to provide an indicating device that may be readily adaptable to the measurement of other phenomena besides that of temperature.

I have accomplished the foregoing objects by the use of a hollow tube coiled into the form of a helix containing a thermometric or barometric fluid, at one end of which it is provided with suitable apparatus or means that will react to the phenomena desired to be measured.

For a better understanding of the invention, reference is made to one possible embodiment of my invention as shown in the appended elevational view of a thermometer for actually measuring large ranges of temperature, read in connection with the following description and the appended claims.

Referring to the figure, the indicating device is seen to consist of a hollow terminus 1, closed at one end, and opening at the other end into one end of a straight hollow shank 2. The other end of this hollow shank 2 in turn opens into one end of a hollow helical member 3. The helical member 3 will be made of a translucent or transparent substance and is provided with suitable graduations 4. The other end of the helical member 3 terminates in a straight hollow shank 5, which shank is closed at its extreme end. The shanks 2, 5 are coaxially disposed and are respectively provided with tubular bearing collars 7, 8 which snugly fit said shanks. The hollow terminus 1 is filled with mercury 6, which mercury in the drawing is shown to have expanded a distance up into the helical member 3.

It is readily seen that in use the thermometer just described is read by rotating the thermometer about the shank axis so as to read the scale on the outside of the hollow helical member 3.

The bearing collars 7, 8 furnish a convenient means of manually rotating the indicating device or said collars may be rotatably mounted in supports so that the thermometer may be suitably rotated for reading.

There are two conspicuous characteristics of the construction shown. First the helical member 3 is open to the surrounding air all around and its coils are spaced appreciably from each other, no enclosure of any kind being used in connection with it. Secondly the indications or graduations 4 extend around the peripheral surface of the tube, as shown, and are readable in all positions and directions. Since the structure is open and is up-sloped gradually in its helical contour, its thermometric or barometric fluid inside, offers less resistance to the effects of gravity as it rises or expands in the tube. It is more sensitive and accurate, than forms requiring a graduated backing to support them and for graduations and their thermometric or barometric fluid has a direct vertical rise. The backing in such instances interferes with the free flow of air to the thermometer or instrument and interposes an obstruction to the reception of heat radiation. Such backing dampens the response and renders the device less critical in accuracy, especially where the environment is subject to relatively rapid variables in temperature.

I have thus disclosed a compact and easily read means of indicating temperature. It is obvious that this device could be used to measure other phenomena. For example, the terminus 1 might be replaced by equipment responsive to changes in atmospheric pressure. It is thus my desire that my invention be not limited by the embodiment which I have disclosed, but rather that my invention be read in the spirit of the attached claims.

I claim:

1. An indicating device comprising a liquid indicating substance, a hollow terminus for containing said indicating substance, a tubular shank having its lower end open to said terminus, a collar member about said shank, a transparent tubular helical member having at its lower end an opening to the upper end of said shank, graduations arranged along said helical member, a second tubular shank closed at its upper end and having an opening at its lower end to the upper end of said helical member, and a collar about said second shank.

2. In a device of the class described, a transparent helical tubing, graduations arranged along said helical tubing, a bulb-like terminus at the lower end of said helical tubing, a liquid indicating substance within said bulb-like terminus, and means whereby the said device may be rotated, said means comprising bearing collars coaxial with the axis of the helical tubing and secured to the tubing at opposite ends thereof.

CHARLES J. BRASEFIELD.

REFERENCES CITED

The following references are of record in the file of this patent:

UNITED STATES PATENTS

| Number | Name | Date |
|---|---|---|
| 841,454 | Sargent | Jan. 15, 1907 |
| 2,303,111 | Cuyler et al. | Nov. 24, 1942 |

FOREIGN PATENTS

| Number | Country | Date |
|---|---|---|
| 556 | Great Britain | Mar. 2, 1859 |
| 22,904 | France | Feb. 9, 1859 |
| 40,676 | Germany | Sept. 2, 1887 |
| 82,367 | Germany | Aug. 5, 1895 |